US008965885B2

(12) United States Patent
Venkateswaran et al.

(10) Patent No.: US 8,965,885 B2
(45) Date of Patent: Feb. 24, 2015

(54) SYSTEM AND METHOD FOR BROWSING WEB PAGES ON A MOBILE COMMUNICATION DEVICE

(75) Inventors: Ayalur S. Venkateswaran, Lindenhurst, IL (US); Amit Eswaraiah, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1096 days.

(21) Appl. No.: 11/559,470

(22) Filed: Nov. 14, 2006

(65) Prior Publication Data

US 2008/0113659 A1  May 15, 2008

(51) Int. Cl.
*G06F 17/30* (2006.01)
*H04M 1/725* (2006.01)

(52) U.S. Cl.
CPC ..... *H04M 1/72561* (2013.01); *G06F 17/30905* (2013.01); *H04M 1/7253* (2013.01)
USPC .......................................... 707/728

(58) Field of Classification Search
CPC ................................................ G06F 17/30905
USPC ............................... 707/1, 728; 345/660, 698
See application file for complete search history.

(56) References Cited

U.S. PATENT DOCUMENTS

| 6,654,038 B1 | 11/2003 | Gajewska et al. |
| 2002/0190947 A1 | 12/2002 | Feinstein |
| 2003/0115167 A1 | 6/2003 | Sharif et al. |
| 2003/0156074 A1 | 8/2003 | Ranganathan et al. |
| 2003/0179189 A1* | 9/2003 | Lira ............................... 345/173 |
| 2004/0183817 A1* | 9/2004 | Kaasila ......................... 345/660 |
| 2004/0268393 A1 | 12/2004 | Hunleth et al. |
| 2005/0081149 A1 | 4/2005 | Vale |
| 2006/0089160 A1 | 4/2006 | Othmer |

OTHER PUBLICATIONS

"S60 Open to new features", http://www.s60.com/business/productinfo/applicationsandtechnologies/webrowser, Oct. 20, 2006, 3 pages.

* cited by examiner

*Primary Examiner* — Sheree Brown

(74) *Attorney, Agent, or Firm* — McDermott Will & Emery LLP

(57) ABSTRACT

A mobile device (102) for browsing web pages is described. The mobile device (102) comprises a wireless transceiver (202), a processor (204) and a display (208). The wireless transceiver (202) is configured to receive (306) a web page from a remote server (104) via a wireless communication link (106, 108, 110). The processor (204) is configured to determine (308) whether a display parameter associated with the received web page exceeds a display threshold value. The display (208) is configured to display (310) the received web page in a first navigation mode if the display parameter does not exceed the display threshold value, and display (312) the received web page in a second navigation mode if the display parameter exceeds the display threshold value.

10 Claims, 2 Drawing Sheets

SYSTEM AND METHOD FOR BROWSING WEB PAGES ON A MOBILE COMMUNICATION DEVICE

FIELD OF THE INVENTION

The present invention relates generally to the field of mobile communication devices having the capability of browsing web pages of the web servers. In particular, the present invention relates to wireless communication devices having small displays, relative to stationary computing devices, and browser applications for wireless communication devices that facilitate a user's ability to view content of the web servers on relatively small displays.

BACKGROUND OF THE INVENTION

Web servers manage information spaces having resources, such as text, images and multimedia, identified by identifiers called Uniform Resource Identifiers ("URI"), which provide a simple structure for access these resources. The Worldwide Web ("WWW") is a global information space that is widely known, but web servers are also part of private networks and various types of file systems. The Personal computers, such as desktop and laptop computers, utilize a client application, namely a web browser, to display and interact with the resources of the web servers. The web browser provides a user with access to web pages of web sites managed by web servers, and each web page may include one or more hyperlinks to other web pages at the same or different web sites. Web browsers provide computers with the capability of traversing these hyperlinks, thus facilitating access to the information of the web servers.

Many mobile communication devices, such as cellular phones, personal WiFi communicators, and web-accessible consumer devices, include web browsers, and have the capability of traversing hyperlinks of web pages managed by web servers. On the other hand, mobile communication devices typically have diminutive form factors in order to be conveniently portable, i.e., easily placed in one's pocket and/or operated in one hand (or perhaps two hands for larger units). As such, mobile communication devices have displays with smaller dimensions relative to personal computers. For example, in contrast to a notebook computer, a cellular phone may be carried in one's pants pocket and operated for web browsing in one hand, but the resolution of a cellular phone display is typically a fraction of the resolution of a notebook computer display. Thus, web pages designed for viewing on a personal computer will probably be wider and taller than the display dimension and resolution of a mobile communication device, particularly if the web pages are to remain readable on the display.

To compensate for the smaller dimension and resolution of its display, a mobile communication device may include a customized web browser to facilitate traversing hyperlinks of a web page designed for viewing on a personal computer display. For example, some web browsers include a panning mode in which directional selections of a keypad would direct the content to scroll in the direction corresponding to the keypad selection. When a desired hyperlink is spotted, the user operates other keys or manually changes the mode of the same keys to select the desired hyperlink. Other web browsers include a link navigation mode in which keypad selections would allow the user to jump from hyperlink-to-hyperlink. In addition to the hyperlinks of the web page shown on the display, the web browser may jump to other hyperlinks not shown on the display until the web browser jumps to the hyperlink. Still other web browsers include a page reduction mode in which the entire web page is shown on the display, but content is not shown in detail and hard to view. From the birds-eye view, the user may select the portion of the web page of interest and, in response, the web browser will jump to this selected portion and enlarge it to its normal detailed view. Thereafter, the user manually selects the desired hyperlink in the selected portion.

Existing web browsers, such as those described above, require navigation on a web page that can be cumbersome and take several key strokes to get the section/link desired by a user. Thus, there is a need for a mobile communication device that facilitates browsing web pages for accessing information of web servers by minimizing the number of key strokes required to traverse hyperlinks. A mobile communication device may facilitate web browsing by automatically selecting the optimal mode for viewing web pages, thus minimizing the need for a user to select the appropriate viewing mode.

DETAILED DESCRIPTION OF THE EMBODIMENTS

The mobile communication device, in accordance with the present invention, facilitates web browsing by automatically selecting an optimal mode for viewing web pages, thus minimizing the need for manual selection by a user. The automatic switching of modes is important, because minimizes the number of key presses required by the user. The mobile communication device automatically selects the optimal mode based on a display parameter associated with each web page, as described below.

One aspect of the present invention is a mobile device for browsing web pages. The mobile device comprises a wireless transceiver, a processor and a display. The wireless transceiver is configured to receive a web page from a remote server via a wireless communication link. The processor is configured to determine whether a display parameter associated with the received web page exceeds a display threshold value. The display is configured to display the received web page in a first navigation mode if the display parameter does not exceed the display threshold value, and display the received web page in a second navigation mode if the display parameter exceeds the display threshold value.

Another aspect of the present invention is a method for browsing web pages on a mobile device with a display. The mobile device receives a web page from a remote server. The mobile device then determines whether a display parameter associated with the received web page exceeds a display threshold value. If the display parameter does not exceed the display threshold, then the mobile device selects a first navigation mode, such as a link navigation mode. If, on the other hand, the display parameter exceeds the display threshold value, then the mobile device selects a second navigation mode that is different from the first navigation mode, such as a panning mode or a page reduction mode.

Figure 1:
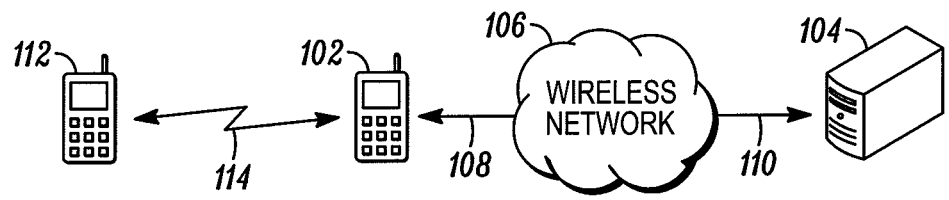
FIG. 1 is a system view of a preferred embodiment in accordance with the present invention.

Referring to FIG. 1, a wireless communication system 100 in accordance with the present invention comprises a mobile device 102 communicating with one or more web servers 104 via a wireless network 106. The mobile device 102 communicates with the wireless network 106 via wireless connection 108, and the wireless network communicates with the web server(s) 104 via network connection 110. Wireless communication links or connections utilized by the wireless network 106 include, but are not limited to, cellular-based digital communications such as CDMA, TDMA, GSM, iDEN, GPRS, EDGE, UMTS, WCDMA, IEEE 802.16, and their variants.

The wireless communication system 100 in accordance with the present invention may further or instead comprise the mobile device 102 communicating with one or more web servers directly, instead of via a wireless network. The mobile device 102 communicates with the remote web server, such as remote mobile device 112, via wireless connection 114. Wireless communication links or connections utilized by the remote mobile device 112 include, but are not limited to, peer-to-peer or ad hoc communications such as HomeRF, Bluetooth, IEEE 802.11 (a, b, g, or n), and IEEE 802.16; and other forms of wireless communication such as infrared technology.

Figure 2:
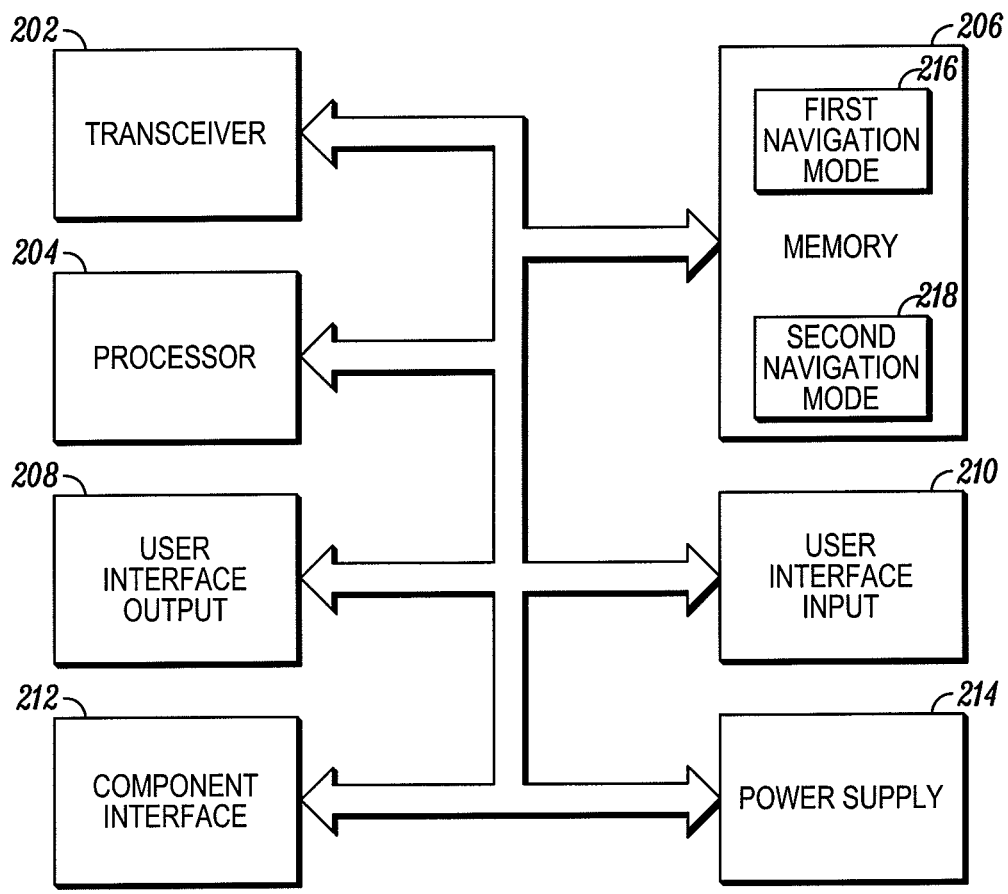
FIG. 2 is a block diagram representing exemplary components of at least one mobile communication device of FIG. 1.

Referring to FIG. 2, there is provided a block diagram illustrating exemplary internal components 200 of a mobile device, such as mobile devices 102 and 112 of FIG. 1, in accordance with the present invention. The exemplary embodiment includes one or more wireless transceivers 202, a processor 204, a memory portion 206, one or more user interface ("UI") output components 208, and one or more UI input components 210. Each embodiment may include a user interface that comprises one or more output components 208 and one or more input components 210. Each transceiver 202 may utilize wireless technology for communication, such as the wireless communication links or connections described above. The internal components 200 may further include a component interface 212 to provide a direct connection to auxiliary components or accessories for additional or enhanced functionality. The internal components 200 preferably include a power supply 214, such as a battery, for providing power to the other internal components while enabling the mobile device 102 to be portably mobile.

An exemplary function of the wireless communication device 102 as represented by the internal components 200, upon reception of wireless signals, the internal components detect communication signals and the transceiver 202 demodulates the communication signals to recover incoming information, such as voice and/or data, transmitted by the wireless signals. After receiving the incoming information from the transceiver 202, the processor 204 formats the incoming information for one or more output components 208. Likewise, for transmission of wireless signals, the processor 204 formats outgoing information, which may or may not be activated by the input components 210, and conveys the outgoing information to the transceiver 202 for modulation to communication signals. The transceiver 202 conveys the modulated signals to a remote device, such as web server(s) 104, 112.

The input and output components 208, 210 of the internal components 200 may include a variety of visual, audio and/or mechanical outputs. For example, the output component(s) 208 may include a visual output component such as a liquid crystal display and light emitting diode indicator, an audio output component such as a speaker, alarm and/or buzzer, and/or a mechanical output component such as a vibrating mechanism. Likewise, by example, the input components 210 may include a visual input component such as an optical sensor (for example, a camera), an audio input component such as a microphone, and a mechanical input component such as a flip sensor, keyboard, keypad, selection button, touch pad, touch screen, capacitive sensor, motion sensor, and switch. Actions that may actuate one or more input components 210 include, but not limited to, opening the wireless communication device, unlocking the device, moving the device to actuate a motion, moving the device to actuate a location positioning system, and operating the device.

The memory portion 206 of the internal components 200 may be used by the processor 204 to store and retrieve data. The data that may be stored by the memory portion 206 include, but is not limited to, operating systems, applications, and data. Each operating system includes executable code that controls basic functions of the communication device, such as interaction among the components of the internal components 200, communication with external devices via the transceiver 202 and/or the component interface 212, and storage and retrieval of applications and data to and from the memory portion 206. Each application includes executable code utilizes an operating system to provide more specific functionality for the communication device, such web browsing by a client application. Data is non-executable code or information that may be referenced and/or manipulated by an operating system or application for performing functions of the communication device. For the web browser used by the mobile device 102, first and second navigation modes 216, 218 must be identified and stored in the memory portion 206 as part of the client application or as separate data accessible by the client application.

Figure 3:
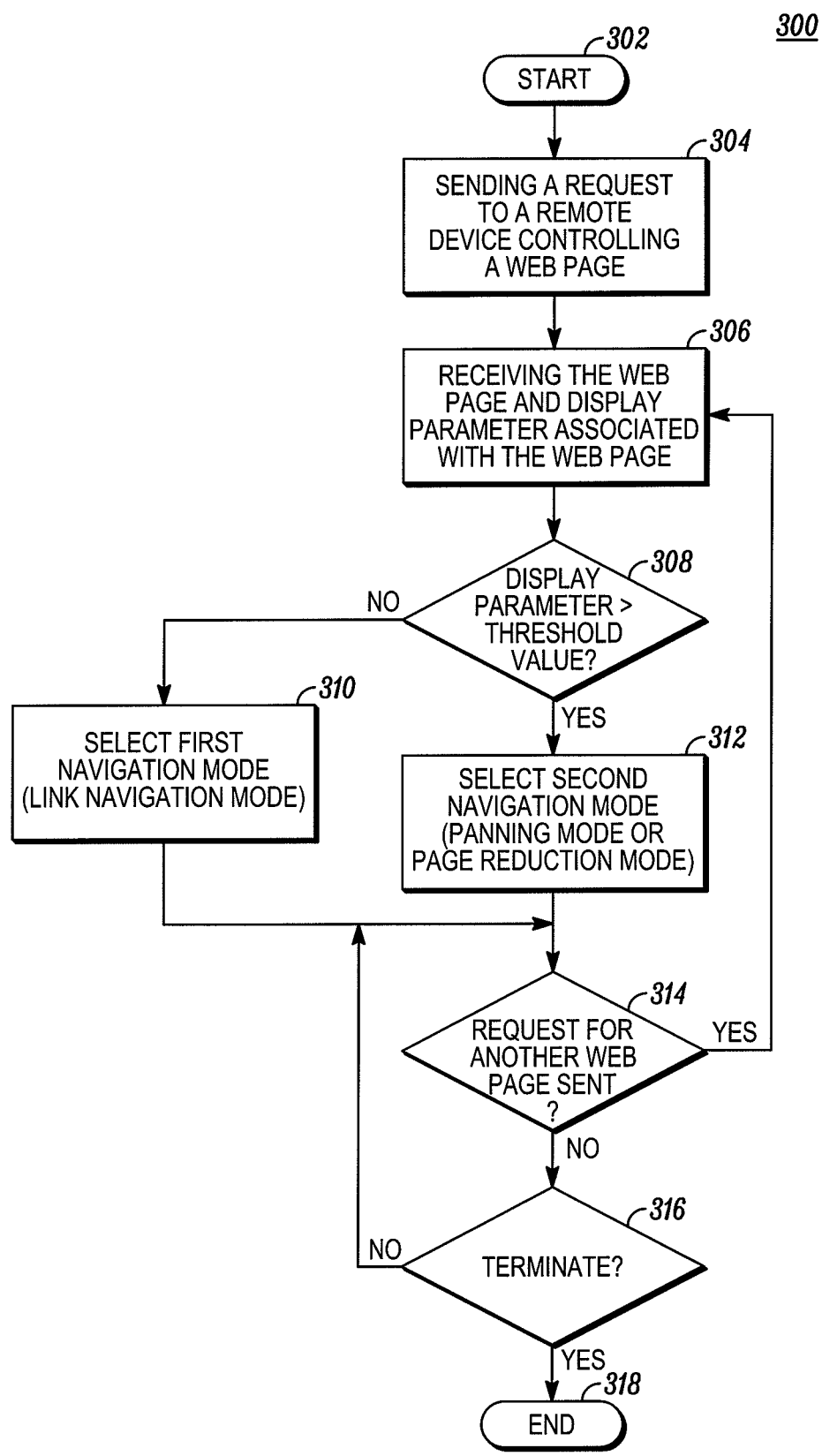
FIG. 3 is a flow diagram illustrating an exemplary operation of at least one mobile communication device of FIG. 1.

Referring FIG. 3, there is shown a flow diagram illustrating an exemplary operation 300 of the mobile device 102 (and/or the remote mobile device 112). The exemplary operation starts at step 302 after a web browser has been launched by the mobile device 102. For one embodiment, the mobile device 102 sends via the transceiver 202 a request to a remote device 104, 112 managing or controlling a desired web page at step 304. The transceiver 202 of the mobile device 102 then receives the requested web page from the remote device 104, 112 at step 306. The transceiver 202 may optionally receive display parameters associated with the web page, with the display parameters or separately, where the mobile device does not determine the display parameters itself. It should be noted that the mobile device 102 may receive the web page and display parameters without sending any type of request for the web page and, thus, step 304 may not be necessary for other embodiments in accordance with the present invention.

The display parameters received at step 306 may be any type of information that assists the processor 204 of the mobile device 102 to determine the optimal mode for browsing the received web page automatically, without requiring user input or assistance, at step 308. For one embodiment, the display parameters received at step 306 may determine the optimal mode for browsing the received web page based on content of the web page at step 308. For example, the mobile device 102 may determine the quantity of web links, such as hyperlinks, associated with the received web page, as received from the web server 104, 112 or determined by the mobile device. For this embodiment, the processor 204 may determine that a web page having a lesser quantity of web links that does not exceed a display threshold value may be navigated by a link navigation mode, whereas a web page having a greater quantity of web links that exceeds the display threshold value may be navigated by a panning mode or a page reduction mode.

For another embodiment, the remote device 104, 112 may provide a display parameter that indicates the size of the web page, such as in terms of bits or bytes of information. This file size information may be provided, for example, in the header of the received signal. For this embodiment, the processor 204 may determine that a smaller web page having a size that does not exceed a display threshold value may be navigated by a link navigation mode, whereas a larger web page having a size that exceeds the display threshold value may be navigated by a panning mode or a page reduction mode.

The display parameter may also be determined by the mobile device 102 and does not need to be received from the remote device. For example, the size of the web page may be determined by counting the number of data packets, bytes or bits of the web page as it is received by the transceiver 202 or after it has been stored in the memory portion 206.

After determining whether a display parameter associated with the received web page exceeds a display threshold value at step 308, the processor 204 of the mobile device 102 selects a navigation mode. If the display parameter does not exceed the display threshold value, then the processor 204 selects a first navigation mode for browsing the received web page, as represented by step 310. On the other hand, if the display parameter exceeds the display threshold value, then the processor 204 selects a second navigation mode different from the first navigation mode. For example, for one embodiment, the first navigation mode may be a link navigation mode and the second navigation mode may be a panning mode or a page reduction mode, as represented by step 312.

After a navigation mode is selected, the mobile device 102 may determine whether another web page has been sent by the remote web server 104, 112 or a different web server at step 314. If so, then the transceiver 202 of the mobile device 102 may proceed to receive the web page at step 306. Also, after a navigation mode is selected, the mobile device 102 may determine whether the operation 300 is to be terminated at step 316. For example, the operation 300 may be terminated in response to user input at the input component 210 or based on a detected occurrence. If so, then the operation 300 terminates at step 318. Otherwise, if the mobile device 102 does not determine that another web page has been sent by a remote web server 104, 112 or that the operation 300 is to be terminated, then the mobile device will neither receive another web page nor terminate the operation.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for browsing web pages on a mobile device with a display, the method comprising:
    receiving a web page;
    determining whether a quantity of web links associated with the received web page exceeds a display threshold value;
    selecting a first navigation mode if the quantity of web links does not exceed the display threshold value; and
    selecting a second navigation mode, different from the first navigation mode, if the quantity of web links exceeds the display threshold value.

2. The method of claim 1, wherein:
    selecting a first navigation mode includes selecting a link navigation mode; and
    selecting a second navigation mode includes selecting a panning mode or a page reduction mode.

3. The method of claim 1, wherein determining whether the quantity of web links of the received web page exceeds a display threshold value includes determining a file size of the received web page from the quantity of web links.

4. The method of claim 1, further comprising receiving the quantity of web links associated with the web page from a remote device.

5. The method of claim 1, wherein receiving a web page includes receiving the web page in response to sending a request to a remote device controlling the web page.

6. A mobile device for browsing web pages, the mobile device comprising:
    a wireless transceiver configured to receive a web page;
    a processor configured to determine whether a quantity of web links associated with the received web page exceeds a display threshold value; and
    a display configured to display the received web page in a first navigation mode if the quantity of web links does not exceed the display threshold value, and display the received web page in a second navigation mode if the quantity of web links exceeds the display threshold value.

7. The mobile device of claim 6, wherein the first navigation mode is a link navigation mode and the second navigation mode is a panning mode or a page reduction mode.

8. The mobile device of claim 6, wherein the processor determines a file size of the received web page from the quantity of web links.

9. The mobile device of claim 6, wherein the wireless transceiver receives the quantity of web links associated with the web page from a remote device.

10. The mobile device of claim 6, wherein the wireless transceiver receives a web page in response to sending a request to a remote device controlling the web page.

* * * * *